(12) United States Patent
Cabanillas et al.

(10) Patent No.: US 7,848,713 B2
(45) Date of Patent: Dec. 7, 2010

(54) COMMON MODE SIGNAL ATTENUATION FOR A DIFFERENTIAL DUPLEXER

(75) Inventors: Jose Cabanillas, San Diego, CA (US); Prasad S. Gudem, San Diego, CA (US); Sai Chong Kwok, Escondido, CA (US); David Love, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 566 days.

(21) Appl. No.: 11/864,338

(22) Filed: Sep. 28, 2007

(65) Prior Publication Data

US 2009/0068963 A1 Mar. 12, 2009

Related U.S. Application Data

(60) Provisional application No. 60/971,207, filed on Sep. 10, 2007.

(51) Int. Cl.
*H04B 1/46* (2006.01)
(52) U.S. Cl. .............. 455/83; 455/78; 455/82; 455/248.1; 343/861
(58) Field of Classification Search ........... 455/83, 455/78, 82, 248.1, 129, 284, 287, 292, 296; 343/861, 750
See application file for complete search history.

(56) References Cited

U.S. PATENT DOCUMENTS

| 6,721,544 | B1 * | 4/2004 | Franca-Neto | 455/83 |
| 7,245,883 | B2 * | 7/2007 | Nakatani et al. | 455/78 |
| 2004/0192230 | A1 * | 9/2004 | Franca-Neto | 455/101 |
| 2007/0243833 | A1 * | 10/2007 | Nakatani et al. | 455/78 |
| 2010/0029323 | A1 * | 2/2010 | Tasic et al. | 455/550.1 |

* cited by examiner

*Primary Examiner*—Minh D Dao
(74) *Attorney, Agent, or Firm*—Jiayu Xu

(57) ABSTRACT

Techniques for attenuating undesired signal components from a differential duplexer are described. The duplexer provides a differential received signal at RX+ and RX− ports. This differential received signal includes an undesired common mode signal, which may come from a transmit signal. The common mode signal is attenuated with a common mode trap in an impedance matching network coupled to the RX+ and RX− ports. The matching network includes a first passive circuit coupled between the RX+ port and a first node, a second passive circuit coupled between the RX− port and a second node, and the common mode trap coupled between the first and second nodes. In one design, the common mode trap includes a first inductor coupled between the first node and a common node, a second inductor coupled between the second node and the common node, and a capacitor coupled between the common node and circuit ground.

26 Claims, 5 Drawing Sheets

COMMON MODE SIGNAL ATTENUATION FOR A DIFFERENTIAL DUPLEXER

RELATED APPLICATIONS

This application claims benefit of U.S. Provisional Application No. 60/971,207 titled "COMMON MODE SIGNAL ATTENUATION FOR A DIFFERENTIAL DUPLEXER," filed Sep. 10, 2007, the entire disclosure of this application being considered part of the disclosure of this application.

BACKGROUND

I. Field

The present disclosure relates generally to electronics, and more specifically to techniques for attenuating undesired signal components from a duplexer in a wireless communication device.

II. Background

A wireless communication device (e.g., a cellular phone) may have a transmitter and a receiver to support two-way radio communication with a wireless communication system. For data transmission, the transmitter may modulate a radio frequency (RF) carrier signal with data to obtain a modulated signal. The transmitter may further filter and amplify the modulated signal to obtain a transmit signal and may then transmit this signal via a wireless channel to base stations in the wireless system. For data reception, the receiver may receive signals from base stations and may process a received signal to recover data sent by the base stations to the wireless device.

The wireless system may utilize frequency division duplexing (FDD). With FDD, one frequency channel is used for the forward link (or downlink) from the base stations to the wireless device, and another frequency channel is used for the reverse link (or uplink) from the wireless device to the base stations. The wireless device may be able to simultaneously transmit and receive data on the two frequency channels. The wireless device may have a duplexer to route an RF input signal from an antenna to the receiver and to route the transmit signal from the transmitter to the antenna. The duplexer provides isolation between the transmitter and the receiver sharing the same antenna. Ideally, the duplexer should not couple any of the transmit signals to the receiver. In practice, the duplexer may not have good isolation between a transmit port and a receive port, and a relatively large amount of the transmit signal may be coupled to the receiver. The coupled transmit signal may degrade the performance of the receiver or may even cause the receiver to fail specifications.

SUMMARY

Techniques for attenuating undesired signal components from a differential duplexer are described herein. The differential duplexer may receive a transmit signal from a transmitter at a transmit port and provide an RF output signal at an antenna port. The differential duplexer may further receive a single-ended RF input signal from an antenna at the antenna port and provide a differential received signal at differential receive (RX+ and RX−) ports. The differential received signal may include an undesired common mode signal that may come from the transmit signal and/or the RF input signal. The common mode signal is composed of signal components having the same phase at the RX+ and RX− ports.

In an aspect, the common mode signal may be attenuated with a common mode trap in an impedance matching network coupled to the RX+ and RX− ports of the duplexer. The matching network may include a first passive circuit coupled between the RX+ port and a first node, a second passive circuit coupled between the RX− port and a second node, and a shunt circuit component coupled between the first and second nodes. A low noise amplifier (LNA) may have a differential input coupled to the first and second nodes. The shunt circuit component may be replaced with the common mode trap.

In one design, the common mode trap includes a first inductor coupled between the first node and a common node, a second inductor coupled between the second node and the common node, and a capacitor coupled between the common node and circuit ground. In another design, the common mode trap includes a first capacitor coupled between the first node and the common node, a second capacitor coupled between the second node and the common node, and an inductor coupled between the common node and circuit ground. For both designs, a common mode signal component from the RX+ port is attenuated at the first node by a first series LC circuit in the common mode trap, and a common mode signal component from the RX− port is attenuated at the second node by a second series LC circuit in the common mode trap. The resonant frequencies of the series LC circuits may be set within a frequency range for the transmit signal in order to provide good attenuation of the common mode transmit signal components at the RX+ and RX− ports.

Various aspects and features of the disclosure are described in further detail below.

DETAILED DESCRIPTION

Figure 1:
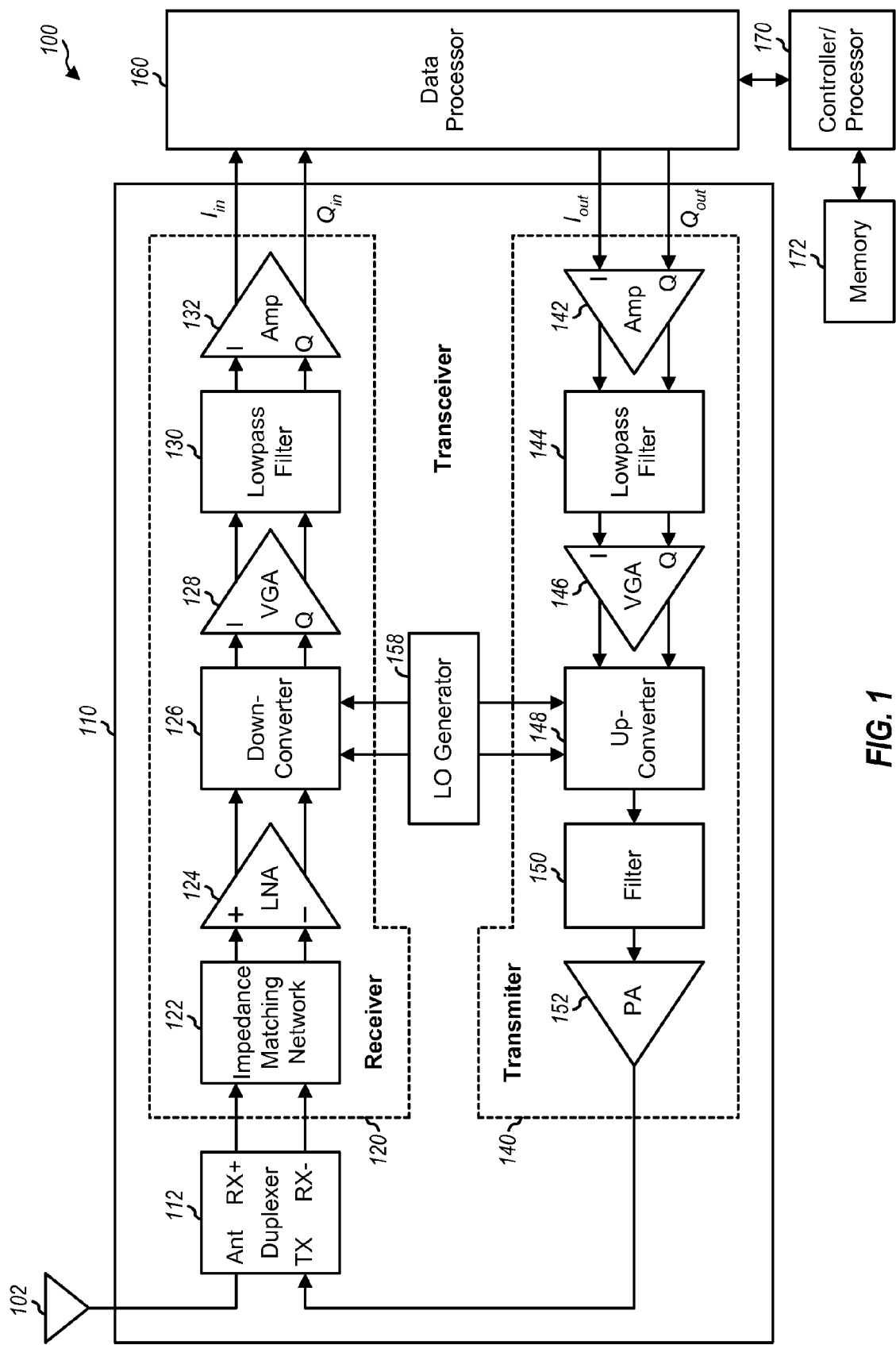
FIG. 1 shows a block diagram of a wireless communication device.

FIG. 1 shows a block diagram of a design of a wireless communication device 100. In this design, wireless device 100 includes an antenna 102, a transceiver 110, a data processor 160, a controller/processor 170, and a memory 172. Transceiver 110 includes a differential duplexer 112, a receiver 120, and a transmitter 140 that support bidirectional radio communication with a wireless communication system. In general, wireless device 100 may include any number of receivers and any number of transmitters for any number of communication systems and frequency bands.

Within transceiver 110, duplexer 112 has an antenna (Ant) port coupled to antenna 102, differential receive (RX+ and RX−) ports coupled to receiver 120, and a transmit (TX) port coupled to transmitter 140. On the receive path, antenna 102 receives forward link signals from base stations and provides a single-ended RF input signal to the Ant port of duplexer 112. Duplexer 112 couples the RF input signal from the Ant port to the RX+ and RX− ports and provides a differential received signal to receiver 120. Within receiver 120, the differential received signal is passed through an impedance matching network 122, amplified by an LNA 124, and downconverted from RF to baseband by a downconverter 126. Downconverter 126 provides inphase (I) and quadrature (Q) downconverted signals, which are amplified by a variable gain amplifier (VGA) 128, filtered by a lowpass filter 130, and amplified by an amplifier (Amp) 132. Amplifier 132 provides I and Q analog input signals $I_{in}$ and $Q_{in}$ to data processor 160.

On the transmit path, data processor 160 processes data to be transmitted and provides I and Q analog output signals $I_{out}$ and $Q_{out}$ to transmitter 140. Within transmitter 140, the I and Q analog output signals are amplified by an amplifier 142, filtered by a lowpass filter 144, amplified by a VGA 146, and upconverted from baseband to RF by an upconverter 148. The upconverted signal is filtered by a bandpass filter 150 and further amplified by a power amplifier (PA) 152 to obtain a transmit signal. Duplexer 112 routes the transmit signal from the TX port to the Ant port and provides an RF output signal to antenna 102.

A local oscillator (LO) generator 158 generates a differential receive LO signal used for frequency downconversion and provides this LO signal to downconverter 126. LO generator 158 also generates a differential transmit LO signal used for frequency upconversion and provides this LO signal to upconverter 148. The frequencies of the transmit and receive LO signals may be determined by the center frequencies of the frequency channels used for data transmission and reception, respectively.

FIG. 1 shows an example transceiver design. In general, the conditioning of the signals in receiver 120 and transmitter 140 may be performed by one or more stages of amplifier, filter, mixer, etc. These circuit blocks may be arranged differently from the configuration shown in FIG. 1. Furthermore, other circuit blocks not shown in FIG. 1 may also be used to condition the signals in the transmitter and receiver. Some circuit blocks in FIG. 1 may also be omitted. All or a portion of transceiver 110 may be implemented in one or more RF integrated circuits (RFICs), mixed-signal ICs, etc.

Data processor 160 may include various processing units for data transmission and reception. Controller/processor 170 may control the operation at wireless device 100. Memory 172 may store program codes and data for wireless device 100. Data processor 160, controller/processor 170, and/or memory 172 may be implemented in one or more application specific integrated circuits (ASICs) and/or other ICs.

Differential duplexer 112 may provide certain advantages over a single-ended duplexer. First, differential duplexer 112 can provide a differential received signal to LNA 124, which may avoid the need for a balun or some other circuit to perform single-ended to differential conversion. Second, differential duplexer 112 may be able to provide better rejection of the transmit signal at the RX+ and RX− ports of the duplexer.

Figure 2:
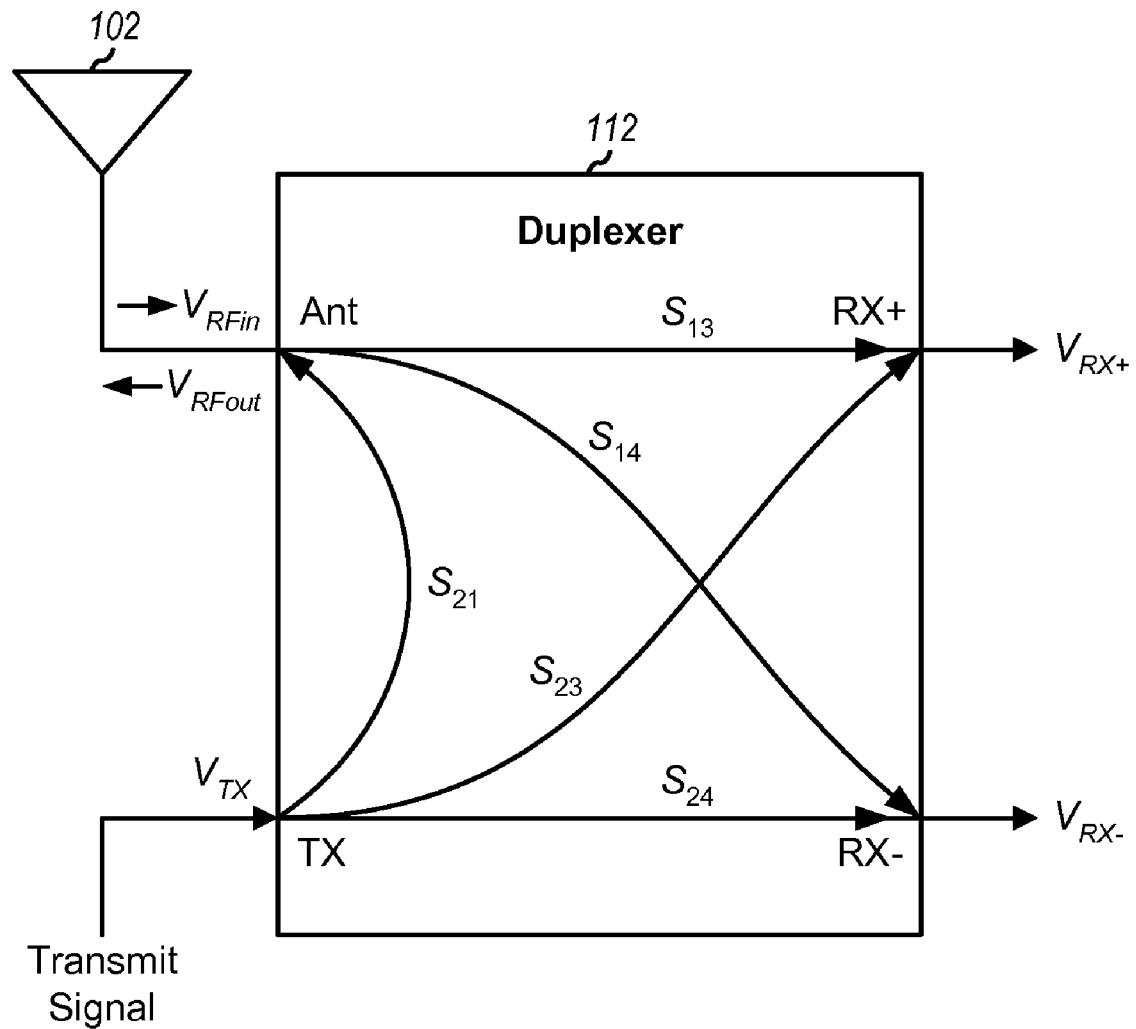
FIG. 2 shows coupling between four ports of a differential duplexer.

FIG. 2 shows the coupling between the four ports of differential duplexer 112. The Ant, TX, RX+ and RX− ports of duplexer 112 may also be referred to as ports 1, 2, 3 and 4, respectively. The transmit signal $V_{TX}$ from transmitter 140 is coupled from the TX port to the Ant port with a complex gain of $S_{21}$, to the RX+ port with a complex gain of $S_{23}$, and to the RX− port with a complex gain of $S_{24}$. The RF input signal $V_{RFin}$ from antenna 102 is coupled from the Ant port to the RX+ port with a complex gain of $S_{13}$ and to the RX− port with a complex gain of $S_{14}$. The received signal $V_{RX+}$ at the RX+ port is composed of the RF input signal coupled from the Ant port and the transmit signal $V_{TX}$ coupled from the TX port. The received signal $V_{RX-}$ at the RX− port is also composed of the RF input signal coupled from the Ant port and the transmit signal $V_{TX}$ coupled from the TX port.

Ideally, gain $S_{21}$ should be large (close to unity) and gains $S_{23}$ and $S_{24}$ should be very small or zero. In this case, most of the transmit signal would be coupled to the Ant port, and very little of the transmit signal would be coupled to the RX+ or RX− port. Ideally, gains $S_{13}$ and $S_{14}$ should be large (close to unity) and have opposite phases. In this case, most of the RF input signal would be coupled to the RX+ and RX− ports.

The differential received signal at the RX+ and RX− ports may be decomposed into a differential mode signal $V_{DM}$ and a common mode signal $V_{CM}$. The differential mode signal has signal components with opposite phases at the RX+ and RX− ports. The common mode signal has signal components with the same phase at the RX+ and RX− ports. The differential mode and common mode signals may include signal components from the RF input signal and the transmit signal.

TX-to-RX isolation is a key parameter of duplexer 112 and has a strong impact on linearity requirements of receiver 120. TX-to-RX isolation determines the amount of transmit signal coupled from the TX port to the RX+ and RX− ports. In general, higher TX-to-RX isolation results in less transmit signal coupling or leakage, which may then relax the linearity requirements of receiver 120. These linearity requirements may be given in terms of second-order intercept point (IP2), third-order intercept point (IP3), triple beat, gain compression, etc.

For differential duplexer 112, some of the transmit signal at the TX port may be coupled to the RX+ and RX− ports. If the Ant port is terminated, then the $V_{RX+}$ signal would contain only transmit signal component coupled from the TX port to the RX+ port, and the $V_{RX-}$ signal would contain only transmit signal component coupled from the TX port to the RX− port. The amplitude and phase of gain $S_{23}$ from the TX port to the RX+ port may or may not match the amplitude and phase of gain $S_{24}$ from the TX port to the RX− port. Hence, $V_{RX+}$ may or may not match $V_{RX-}$.

The differential mode signal $V_{DM}$ includes signal components with opposite phases at the RX+ and RX− ports. If the Ant port is terminated, then the differential mode signal $V_{DM}$ may be expressed as:

$$V_{DM} = \frac{1}{2}(V_{RX+} - V_{RX-}). \quad \text{Eq (1)}$$

The common mode signal $V_{CM}$ includes signal components with the same phase at the RX+ and RX− ports. If the Ant port is terminated, then the common mode signal $V_{CM}$ may be expressed as:

$$V_{CM} = \frac{1}{2}(V_{RX+} + V_{RX-}). \quad \text{Eq (2)}$$

If the transmit signal components at the RX+ and RX− ports have the same magnitude and phase, then duplexer 112 provides infinite differential mode attenuation of the transmit signal. If the transmit signal components at the RX+ and RX− ports have the same magnitude but opposite phases, then duplexer 112 provides infinite common mode attenuation of the transmit signal. In general, the transmit signal component at the RX+ port may have any magnitude and phase relative to those of the transmit signal component at the RX− port.

The amount of differential mode attenuation (DMA) and the amount of common mode attenuation (CMA) for the transmit signal may be given in units of decibels (dB), as follows:

$$DMA = 20\log_{10}\left(\frac{V_{TX}}{V_{DM}}\right), \text{ and} \quad \text{Eq (3)}$$

$$CMA = 20\log_{10}\left(\frac{V_{TX}}{V_{CM}}\right). \quad \text{Eq (4)}$$

Ideally, differential duplexer 112 should provide both very high DMA and very high CMA, so that only a small amount of the transmit signal appears at the RX+ and RX− ports. However, differential duplexer 112 can have either very high DMA or very high CMA even when large transmit signal components are present at the RX+ and RX− ports. High DMA may be obtained when the large transmit signal components have the same phase, and high CMA may be obtained when the large transmit signal components have opposite phases. The large transmit signal components in any form (whether common mode, or differential mode, or a combination of both) may act as jammers for receiver 120. Jammers are large amplitude undesired signals that are outside the bandwidth of a desired signal. However, non-linearity of receiver 120 may generate intermodulation distortion due to the jammers, and the intermodulation distortion may fall within the desired signal bandwidth and degrade performance. Hence, receiver 120 would need to be able to receive a small desired signal in the presence of jammers from the transmit signal.

Differential duplexer 112 may be a commercially available duplexer and may have relatively high DMA but relatively poor CMA. The presence of relatively large common mode (CM) transmit signal components at the input of receiver 120 due to the poor CMA may be as harmful as the presence of differential mode (DM) transmit signal components. In particular, the large CM signal components may make it difficult to pass linearity requirements for IP2, IP3, triple beat, gain compression, etc. These linearity requirements may be especially stringent for a Code Division Multiple Access (CDMA) system.

The CM transmit signal components should be attenuated in order to achieve good performance. A balun or a transformer may be coupled to the RX+ and RX− ports of duplexer 112 and used to attenuate the CM transmit signal components. However, this would increase cost and defeat one of the main reasons for using a differential duplexer, which is to remove the balun. Alternatively, a truly differential receiver with truly differential LNA and subsequent circuit blocks may be used. In this case, the common mode gain may be much smaller than the differential mode gain. The magnitude of the CM signal components may decrease as the CM signal components propagate through the receiver. However, such a truly differential receiver may be more complex, cost more, consume more power, etc.

In an aspect, the common mode signal from the RX+ and RX− ports of duplexer 112 may be attenuated with a common mode trap in matching network 112. The common mode trap may be implemented with passive circuit components and may include series LC circuits, each having an inductor ("L") coupled in series with a capacitor ("C"). The common mode trap may be able to attenuate the CM transmit signal components as well as other CM signal components over a wide range of frequencies while minimally affecting the differential performance of duplexer 112.

Figure 3:
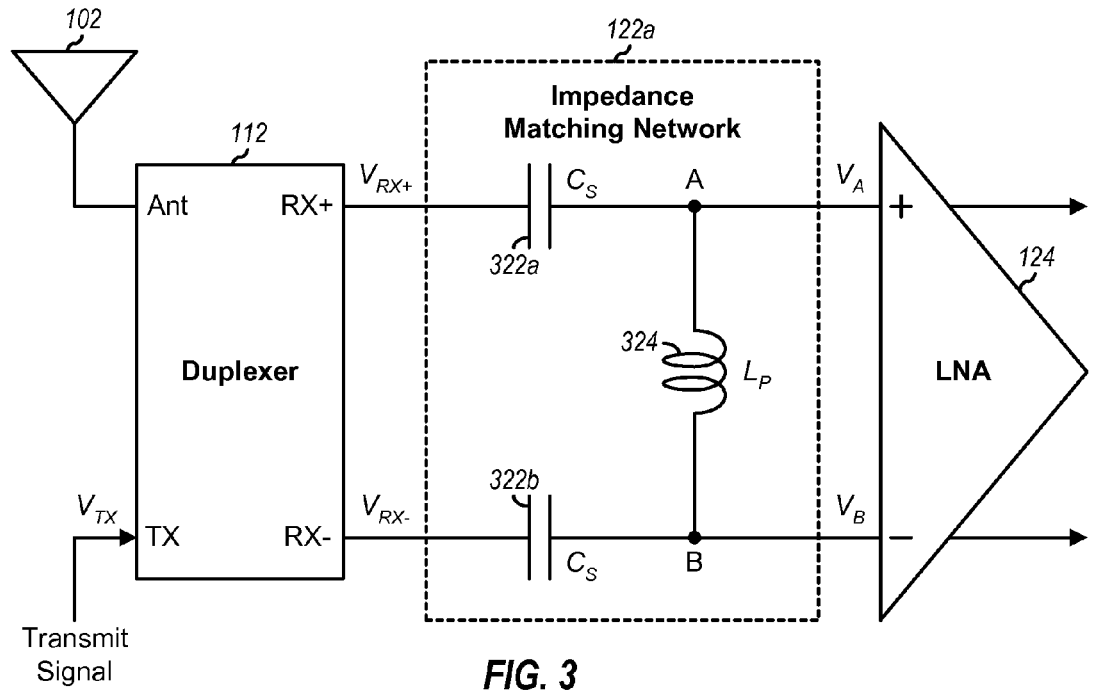
FIG. 3 shows an impedance matching network for the duplexer.

FIG. 3 shows a schematic diagram of an impedance matching network 122a, which is one design of impedance matching network 122 in FIG. 1. In this design, matching network 122a includes capacitors 322a and 322b and an inductor 324. Capacitor 322a has a value of $C_S$ and is coupled between the RX+ port of duplexer 112 and node A. Capacitor 322b also has a value of $C_S$ and is coupled between the RX− port of duplexer 112 and node B. Inductor 324 has a value of $L_P$ and is coupled between nodes A and B. Capacitors 322a and 322b are series circuit components, and inductor 324 is a shunt circuit component. The values of capacitors 322a and 322b and the value of inductor 324 may be selected to obtain the desired impedance matching for the RX+ and RX− ports of duplexer 112 with the differential input of LNA 124 coupled to nodes A and B.

Figure 4:
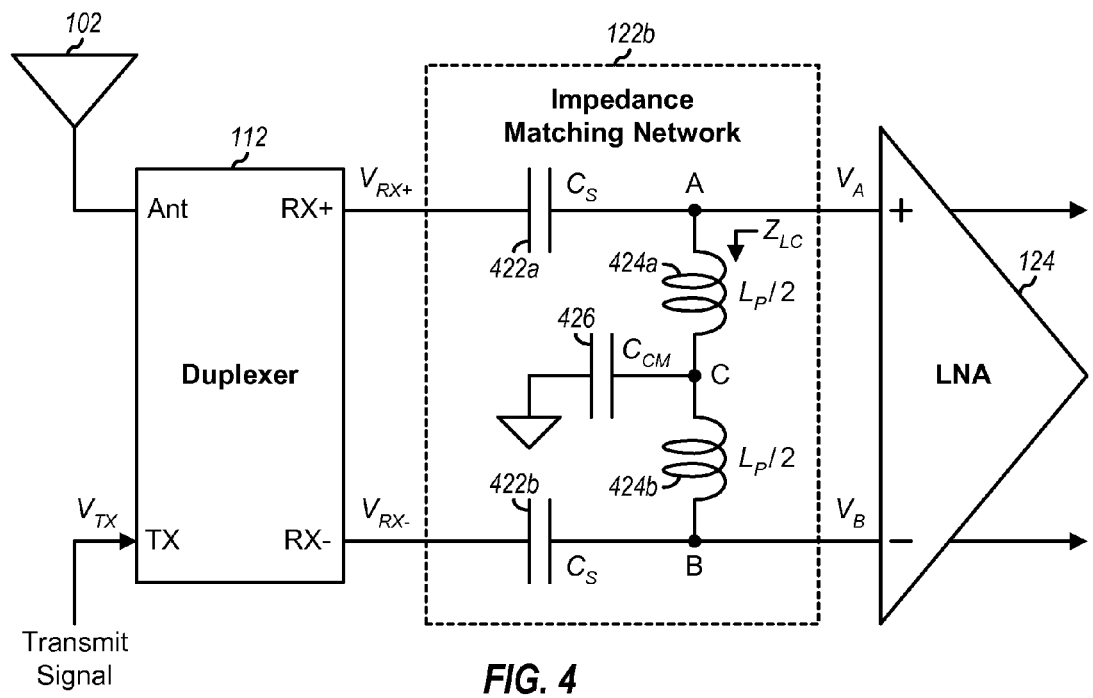
FIG. 4 shows an impedance matching network with a common mode trap.

FIG. 4 shows a schematic diagram of an impedance matching network 122b, which is another design of impedance matching network 122 in FIG. 1. Matching network 122b includes a common mode trap to attenuate the common mode signal from the RX+ and RX− ports of duplexer 112. In the design shown in FIG. 4, matching network 122b includes capacitors 422a, 422b and 426 and inductors 424b and 424b. Capacitor 422a has a value of $C_S$ and is coupled between the RX+ port and node A. Capacitor 422b also has a value of $C_S$ and is coupled between the RX− port and node B. Inductor 424a has a value of $L_P/2$ and is coupled between node A and common node C. Inductor 424b also has a value of $L_P/2$ and is coupled between node B and common node C. Capacitor 426 has a value of $C_{CM}$ and is coupled between common node C and circuit ground.

Matching network 122b in FIG. 4 essentially includes the same circuit components for impedance matching as matching network 122a in FIG. 3. Shunt inductor 324 in matching network 122a has been split into two inductors 424a and 424b each having half of the inductance of inductor 324. Common node C is at the center point of inductors 424a and 424b and is a virtual ground. Hence, a circuit component such as capacitor 426 may be coupled to common node C without altering the differential performance of matching network 122b.

The common mode trap is implemented with inductors 424a and 424b and capacitor 426. The common mode trap includes (i) a first series LC circuit formed by inductor 424a and capacitor 426 and used to attenuate the CM signal component at node A and (ii) a second series LC circuit formed by inductor 424b and capacitor 426 and used to attenuate the CM signal component at node B. Capacitor 426 is shared by both series LC circuits. The two series LC circuits should be identical or matched as closely as possible.

For the differential mode signal $V_{DM}$, the DM signal component at the RX+ port has the same magnitude but opposite phase as the DM signal component at the RX− port. Since capacitor 422a and inductor 424a have the same values as capacitor 422b and inductor 424b, the DM signal component from the RX+ port has the same magnitude but opposite phase as the DM signal component from the RX− port at common node C. Hence, the DM signal components from the RX+ and RX− ports cancel each other at common node C, which is virtual ground to the differential mode signal. Capacitor 426 does not affect the differential mode signal.

For the common mode signal $V_{CM}$, the CM signal component at the RX+ port has the same magnitude and phase as the CM signal component at the RX− port. Since capacitor 422a and inductor 424a have the same values as capacitor 422b and inductor 424b, the CM signal component from the RX+ port has the same magnitude and phase as the CM signal component from the RX− port at common node C. Hence, the CM signal components from the RX+ and RX− ports add together at common node C. Capacitor 426 may be used to provide low impedance for the CM signal components at nodes A and B.

The resonant frequency $f_R$ of the series LC circuit may be expressed as:

$$f_R = \frac{1}{\pi\sqrt{L_P C_{CM}}}. \qquad \text{Eq (5)}$$

As shown in equation (5), the resonant frequency is determined by the values of inductor 424a and capacitor 426 and is not dependent on the value of capacitor 422a. The value of inductor 424a may be determined by the desired impedance matching. The value of capacitor 426 may then be selected such that the resonant frequency is at a desired frequency.

Figure 5:
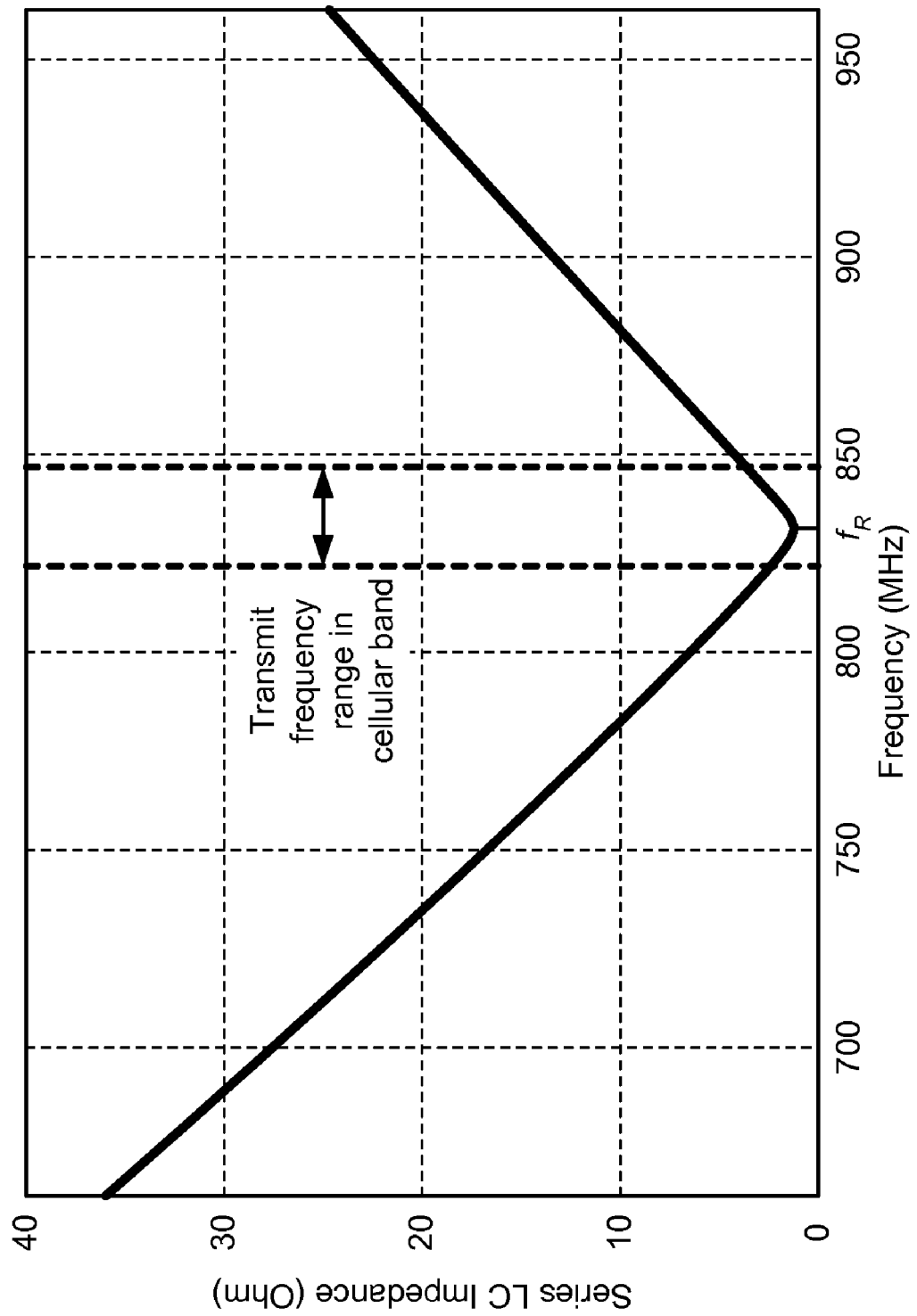
FIG. 5 shows a plot of the series LC impedance of the common mode trap.

FIG. 5 shows a plot of the series LC impedance $Z_{LC}$, which is the impedance of the series LC circuit formed by inductor 424a and capacitor 426 looking into node A in FIG. 4. In this example, the resonant frequency $f_R$ is set to 835 MHz, which is approximately the center of a transmit frequency range from 824 to 849 MHz for cellular band. The series LC impedance has a minimum value at the resonant frequency $f_R$ and increases monotonically for progressively larger frequency offset from the resonant frequency.

The CM signal component at node A may be attenuated the most at the resonant frequency. The resonant frequency may be selected to be at the center of the transmit frequency range or at a particular transmit frequency in order to attenuate the CM transmit signal component from the transmitter. The resonant frequency may also be at some other frequency, which may be outside of the transmit frequency range.

The series LC impedance may be fairly low, e.g., on the order of tens of ohms over a relatively wide range of frequencies. The input impedance of LNA 124 may be several hundred ohms. The series LC impedance may thus be much smaller than the LNA input impedance. Furthermore, inductor 424a and capacitor 426 may be external discrete circuit components having relatively large quality factors (Q). The series LC impedance may thus be low in comparison to the LNA input impedance over a wide range of frequencies and not just around the transmit frequency range, e.g., as shown in FIG. 5. Wideband common mode attenuation may thus be achieved with the series LC circuit.

FIG. 4 shows a design of a common mode trap composed of series LC circuits for attenuating CM signal components from the RX+ and RX− ports of duplexer 112. In general, series LC circuits may be formed based on any shunt circuit component in a matching network. Depending on the type of shunt circuit component (e.g., L or C) in the matching network, one or more complementary circuit components (e.g., C or L) may be added to the matching network to provide low impedance for the CM signal components while being transparent to the DM signal components.

Figure 6:
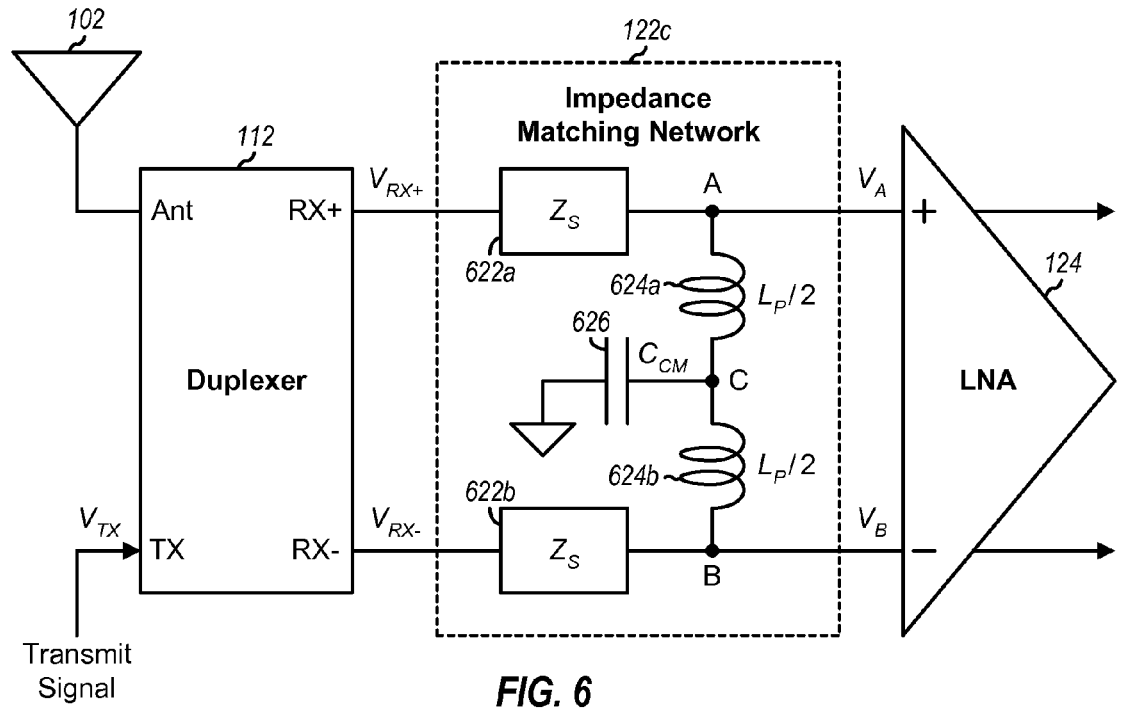
FIG. 6 shows another impedance matching network with a common mode trap.

FIG. 6 shows a schematic diagram of an impedance matching network 122c, which is yet another design of impedance matching network 122 in FIG. 1. Matching network 122c can also attenuate CM signal components from the RX+ and RX− ports of duplexer 112. In the design shown in FIG. 6, matching network 122c includes passive circuits 622a and 622b, inductors 624b and 624b, and a capacitor 626. Passive circuit 622a has an impedance of $Z_S$ and is coupled between the RX+ port and node A. Passive circuit 622b also has an impedance of $Z_S$ and is coupled between the RX− port and node B. Passive circuits 622a and 622b may each comprise one or more inductors, capacitors, resistors, etc. Inductor 624a has a value of $L_P/2$ and is coupled between node A and common node C. Inductor 624b also has a value of $L_P/2$ and is coupled between node B and common node C. Inductors 624a and 624b have a combined value of $L_P$ between nodes A and B. Capacitor 626 has a value of $C_{CM}$ and is coupled between common node C and circuit ground.

The common mode trap includes a first series LC circuit formed by inductor 624a and capacitor 626 and a second series LC circuit formed by inductor 624b and capacitor 626. The value of capacitor 626 may be selected to obtain the desired resonant frequencies for the series LC circuits. As shown in equation (5), the resonant frequency of each series LC circuit not dependent on the impedance $Z_S$ of passive circuit 622a or 622b.

Figure 7:
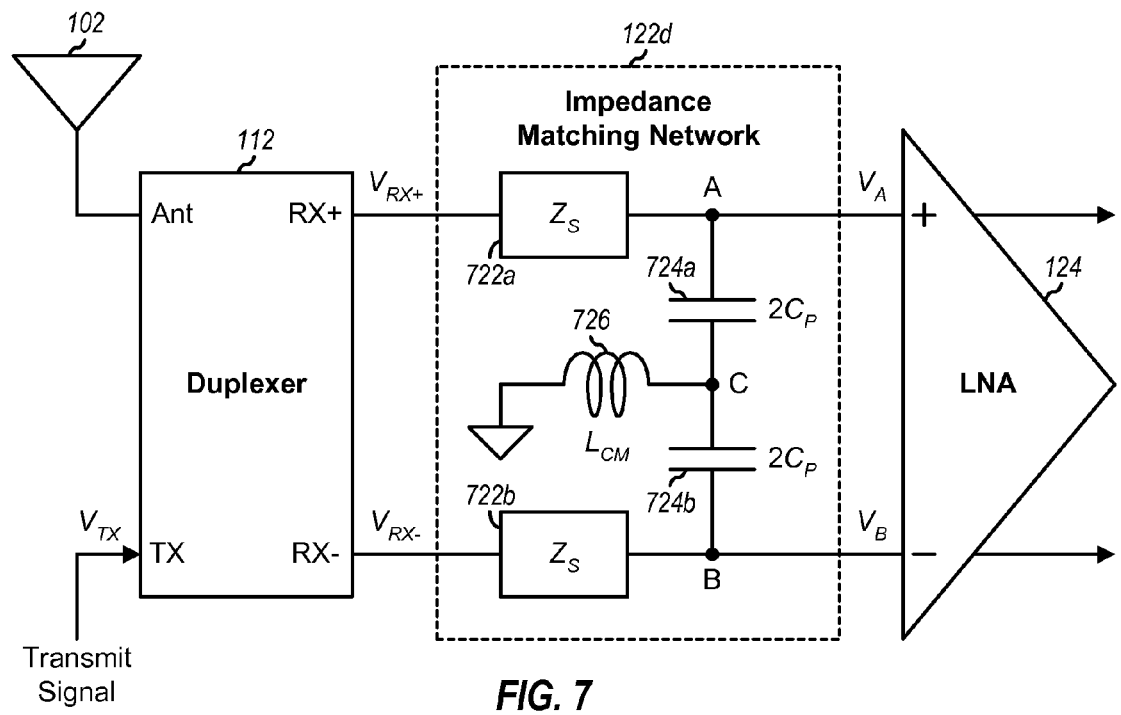
FIG. 7 shows yet another impedance matching network with a common mode trap.

FIG. 7 shows a schematic diagram of an impedance matching network 122d, which is yet another design of impedance matching network 122 in FIG. 1. Matching network 122d can also attenuate CM signal components from the RX+ and RX− ports of duplexer 112. In the design shown in FIG. 7, matching network 122d includes passive circuits 722a and 722b, capacitors 724b and 724b, and an inductor 726. Passive circuit 722a has an impedance of $Z_S$ and is coupled between the RX+ port and node A. Passive circuit 722b also has an impedance of $Z_S$ and is coupled between the RX− port and node B. Passive circuits 722a and 722b may each comprise one or more inductors, capacitors, resistors, etc. Capacitor 724a has a value of $2C_P$ and is coupled between node A and common node C. Capacitor 724b also has a value of $2C_P$ and is coupled between node B and common node C. Capacitors 724a and 724b have a combined value of $C_P$ between nodes A and B. Inductor 726 has a value of $L_{CM}$ and is coupled between common node C and circuit ground.

The common mode trap includes a first series LC circuit formed by capacitor 724a and inductor 726 and a second series LC circuit formed by capacitor 724b and inductor 726. The value of inductor 726 may be selected to obtain the desired resonant frequencies for the series LC circuits.

The common mode trap described herein may be used for various matching networks having a shunt circuit component. These matching networks may have different topologies, and impedance $Z_S$ in FIGS. 6 and 7 may be defined by any function. The shunt circuit component may be an inductor or a capacitor. If the shunt circuit component is an inductor with a value of $L_P$, then this inductor may be split into two inductors with values of $L_P/2$, as shown in FIG. 6. A capacitor may then be added between common node C and circuit ground. If the shunt circuit component is a capacitor with a value of $C_P$, then this capacitor may be split into two capacitors with values of $2C_P$, as shown in FIG. 7. An inductor may then be added between common node C and circuit ground.

In general, an impedance matching network may couple a differential received signal from the differential receive ports of a duplexer to an LNA. The differential received signal may comprise a differential mode signal and a common mode signal. The impedance matching network may comprise a common mode trap for attenuating the common mode signal. The common mode trap may have a resonant frequency located within a transmit frequency range or at some other frequency.

In one design, an apparatus includes a first circuit component coupled between a first node (e.g., node A) and a common node (e.g., node C), a second circuit component coupled between a second node (e.g., node B) and the common node, and a third circuit component coupled between the common node and circuit ground. The first, second and third circuit components provides a low impedance path for a common mode signal received at the first and second nodes from the differential receive ports of a duplexer. An LNA may have a differential input coupled to the first and second nodes.

In one design, the first and second circuit components may be inductors, and the third circuit component may be a capacitor, e.g., as shown in FIG. 6. In another design, the first and second circuit components may be capacitors, and the third circuit component may be an inductor, e.g., as shown in FIG. 7. The first and third circuit components may have a first resonant frequency. The second and third circuit components may have a second resonant frequency matching the first resonant frequency. The duplexer may couple a transmit signal within a transmit frequency range from a transmit port to an antenna port. The first and second resonant frequencies may be within the transmit frequency range.

A first passive circuit (e.g., circuit 622a or 722a) may be coupled between the first node and a first receive port of the duplexer. A second passive circuit (e.g., circuit 622b or 722b) may be coupled between the second node and a second receive port of the duplexer. The first and second receive ports may correspond to the differential receive ports of the duplexer. The first and second passive circuits and the first and second circuit components may be part of an impedance matching network for the differential receive ports of the duplexer.

The common mode trap described herein may provide various benefits in addition to the ones noted above. First, the series LC circuits may be able to attenuate CM LO signal components coupled from LO generator 158 to nodes A and B. There may be a specification on the maximum amount of LO signal at antenna 102. The attenuation of the CM LO signal components by the series LC circuits may assist in meeting this specification. Second, the series LC circuits may improve the "differentiality" of the duplexer over a wide range of frequencies that may include a receive frequency range. The phase difference between the signal components at the differential input of LNA 124 may be closer to 180° with the series LC circuits.

The common mode trap described herein may be used for wireless devices in various wireless communication systems such as Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems. The wireless devices may support various radio technologies such as Universal Terrestrial Radio Access (UTRA) and cdma2000 for CDMA. UTRA includes Wideband-CDMA (W-CDMA) and Low Chip Rate (LCR). cdma2000 covers IS-2000, IS-95 and IS-856 standards. The wireless devices may also support radio technologies such as Evolved UTRA (E-UTRA) and Ultra Mobile Broadband (UMB) for OFDMA. The wireless devices may operate in various frequency bands such as cellular band (which has 824 to 849 MHz transmit range and 869 to 894 MHz receive range), Personal Communication Services (PCS) band (which has 1850 to 1910 MHz transmit range and 1930 to 1990 MHz receive range), IMT-2000 band (which has 1920 to 1980 MHz transmit range and 2110 to 2170 MHz receive range), various UMTS bands, etc.

The common mode trap described herein may be implemented with discrete circuit components (e.g., inductors and capacitors) on a printed circuit board (PCB) and may be external to an IC or an RFIC. These discrete circuit components may be commercially available components of suitable values, which may be dependent on the frequency band covered by the duplexer. The common mode trap may also be implemented within an IC, an RFIC, a mixed-signal IC, an ASIC, etc. The common mode trap may be used in conjunction with other circuit blocks (e.g., LNA) fabricated with various IC process technologies such as complementary metal oxide semiconductor (CMOS), N-channel MOS (N-MOS), P-channel MOS (P-MOS), bipolar junction transistor (BJT), bipolar-CMOS (BiCMOS), silicon germanium (SiGe), gallium arsenide (GaAs), etc. The common mode trap may also be fabricated with any of these IC process technologies.

An apparatus implementing the common mode trap described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a printed circuit board, (vii) a receiver, cellular phone, wireless device, handset, or mobile unit, (viii) etc.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus comprising:
   a first circuit component coupled between a first node and a common node;
   a second circuit component coupled between a second node and the common node; and
   a third circuit component coupled between the common node and circuit ground, the first, second and third circuit components providing a low impedance path through the common node for a common mode signal received at the first and second nodes from differential receive ports of a duplexer.

2. The apparatus of claim 1, wherein the first and second circuit components comprise inductors and the third circuit component comprises a capacitor.

3. The apparatus of claim 1, wherein the first and second circuit components comprise capacitors and the third circuit component comprises an inductor.

4. The apparatus of claim 1, further comprising:
   a first passive circuit coupled between the first node and a first receive port of the duplexer; and
   a second passive circuit coupled between the second node and a second receive port of the duplexer, the first and second receive ports corresponding to the differential receive ports of the duplexer.

5. The apparatus of claim 4, wherein the first and second circuit components comprise inductors, the third circuit comprises a capacitor, and the first and second passive circuits comprise capacitors.

6. The apparatus of claim 4, wherein the first and second passive circuits and the first and second circuit components provide impedance matching for the differential receive ports of the duplexer.

7. The apparatus of claim 1, further comprising:
   a low noise amplifier (LNA) having a differential input coupled to the first and second nodes.

8. The apparatus of claim 1, wherein the first and third circuit components have a first resonant frequency, and wherein the second and third circuit components have a second resonant frequency matching the first resonant frequency.

9. The apparatus of claim 8, wherein the duplexer couples a transmit signal in a transmit frequency range from a transmit port to an antenna port, and wherein the first and second resonant frequencies are within the transmit frequency range.

10. The apparatus of claim 1, wherein the duplexer operates in a cellular band or a Personal Communication Services (PCS) band.

11. The apparatus of claim 1, wherein the first, second and third circuit components are discrete circuit components external to a radio frequency integrated circuit (RFIC).

12. The apparatus of claim 1, wherein the first, second and third circuit components are implemented within a radio frequency integrated circuit (RFIC).

13. A wireless communication device comprising:
a duplexer having differential receive ports;
a first passive circuit coupled between a first of the differential receive ports and a first node;
a second passive circuit coupled between a second of the differential receive ports and a second node;
a first circuit component coupled between the first node and a common node;
a second circuit component coupled between the second node and the common node; and
a third circuit component coupled between the common node and circuit ground, the first, second and third circuit components providing a low impedance path for a common mode signal received at the first and second nodes from the differential receive ports of the duplexer.

14. The wireless communication device of claim 13, wherein the first and second circuit components comprise inductors and the third circuit component comprises a capacitor.

15. The wireless communication device of claim 13, wherein the first and second circuit components comprise capacitors and the third circuit component comprises an inductor.

16. The wireless communication device of claim 13, further comprising:
a low noise amplifier (LNA) having a differential input coupled to the first and second nodes.

17. The wireless communication device of claim 16, wherein the LNA is implemented in a radio frequency integrated circuit (RFIC), and wherein the duplexer, the first and second passive circuits, and the first, second and third circuit components are external to the RFIC.

18. An apparatus comprising:
an impedance matching network for coupling a differential received signal from differential receive ports of a duplexer to a low noise amplifier (LNA), the differential received signal comprising a differential mode signal and a common mode signal, the impedance matching network comprising a common mode trap for attenuating the common mode signal through the common node.

19. The apparatus of claim 18, wherein the duplexer couples a transmit signal in a transmit frequency range from a transmit port to an antenna port, and wherein the common mode trap has a resonant frequency within the transmit frequency range.

20. The apparatus of claim 18, wherein the LNA amplifies the differential mode signal from the duplexer.

21. A method comprising:
coupling a differential received signal from differential receive ports of a duplexer through an impedance matching network to a low noise amplifier (LNA), the differential received signal comprising a differential mode signal and a common mode signal; and
attenuating the common mode signal through the common node with a common mode trap within the impedance matching circuit.

22. The method of claim 21, further comprising:
setting a resonant frequency of the common mode trap to be within a transmit frequency range for the duplexer.

23. The method of claim 21, further comprising:
amplifying the differential mode signal with the LNA.

24. An apparatus comprising:
means for coupling a differential received signal from differential receive ports of a duplexer through an impedance matching network to a low noise amplifier (LNA), the differential received signal comprising a differential mode signal and a common mode signal; and
means for attenuating the common mode signal through the common node with a common mode trap within the impedance matching circuit.

25. The apparatus of claim 24, further comprising:
means for setting a resonant frequency of the common mode trap to be within a transmit frequency range for the duplexer.

26. The apparatus of claim 24, further comprising:
means for amplifying the differential mode signal with the LNA.

* * * * *